March 9, 1937.  E. C. SAINT-JACQUES  2,073,520
SEPARATOR
Filed Feb. 7, 1935  2 Sheets-Sheet 1

Inventor:
Eugène Camille Saint-Jacques,
By Byrnes, Stebbins & Blenko,
attys.

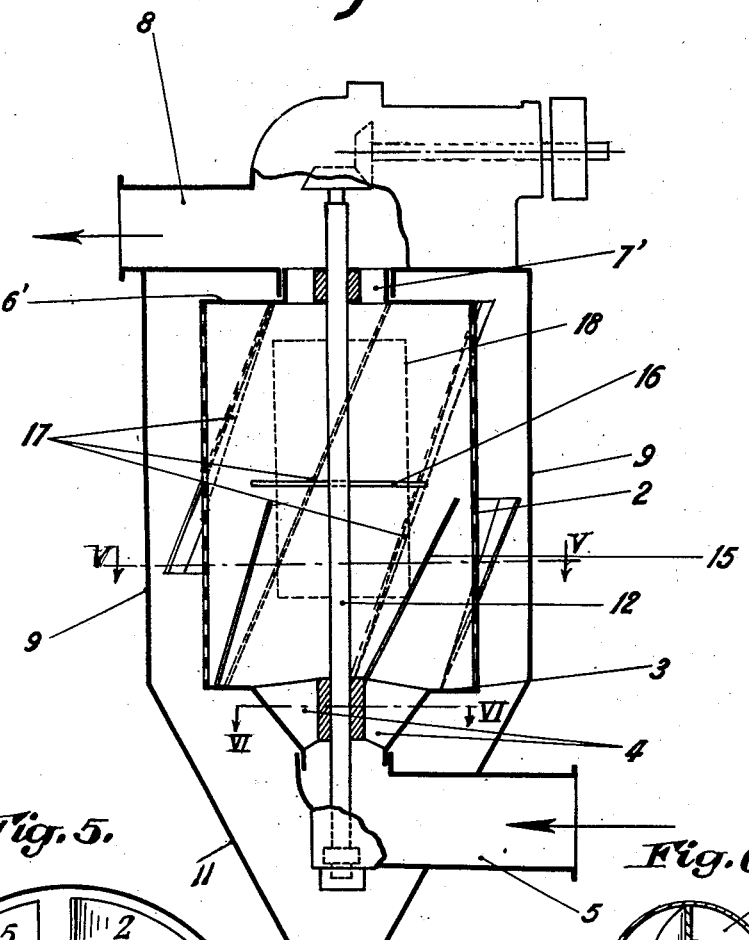
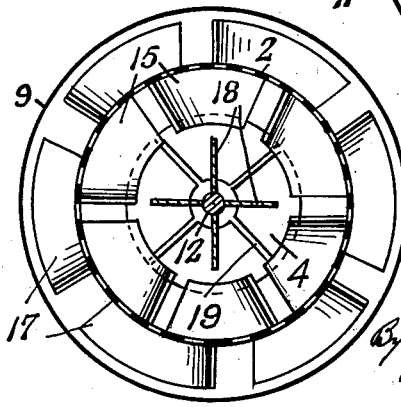
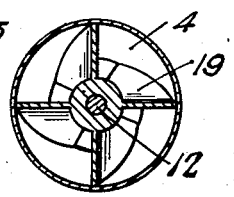

Patented Mar. 9, 1937

2,073,520

UNITED STATES PATENT OFFICE 2,073,520

SEPARATOR

Eugène Camille Saint-Jacques, Paris, France

Application February 7, 1935, Serial No. 5,474
In France February 22, 1934

4 Claims. (Cl. 183—77)

The present invention has as its subject a process and apparatus for separating solid particles from a gaseous or liquid fluid in which they are held in suspension.

The apparatus according to my invention comprises a rotatably mounted drum having a peripheral wall constituted by a screen, a conduit for the supply of the suspension located at the center of the base of said drum, a conduit located at the center of the top of said drum for the removal of fluid, and a fixed fluid tight casing outside said drum and serving for the collection of the solid particles.

By my invention the mixture of fluid and solid particles is caused to enter inside a drum driven with a rapid rotating movement about its axis, and between the periphery and the axis of which gratings or screens are arranged, the meshes of which have dimensions at least equal to those of the largest solid particles to be separated, so as to impart to the said mixture a gyratory movement and to divide it into substantially horizontal jets directed towards the periphery of the drum on to which the solid particles are then applied under the effect of centrifugal force while the fluid is drawn off through the end of the drum opposite that through which its introduction took place.

The periphery of the drum is advantageously constituted by superposed louvres preferably inclined to the horizontal from above to below and from inside to outside so that the solid particles projected against these louvres may be drawn off to the outside progressively which permits a continuous operation of the device. Around the drum in this case there may be disposed a fixed fluid tight wall in which are collected the solid particles separated from the gaseous or liquid fluid.

The rotary drum has for preference a cylindrical form. The gratings or screens provided in its interior may likewise form a cylinder arranged co-axially therewith or may constitute an assembly of polygonal section inscribed in the cylinder of the drum. In this embodiment openings may be arranged along the edges of the prism formed by the screens to permit the direct expulsion to the outside of the drum of the solid materials which may tend to accumulate in the interior angles of the prisms.

The rotary drum may also be provided with a single wall constituted by a grating or screen, having meshes the dimensions of which are at least equal to those of the largest particles to be separated, so that the construction of the apparatus is a very simple one.

The outlet of the fluid at the upper part of the drum may be effected by means of a central conduit analogous to that used for the inlet of the mixture of fluid and solid particles. Preferably the radial partitions which exist in both of these conduits are inwardly curved so as to favour the gyratory movement of the fluid.

Moreover in the interior of the drum there may be advantageously arranged blades fixed against the grating or screen at a convenient inclination with respect to the vertical with the object of accelerating the rotation of the mixture of fluid and solid particles.

At the exterior of the drum there may likewise be fixed on the grating or screen suitably inclined blades intended to increase the speed of rotation of the fluid contained in the annular space which is present between the drum and the fixed wall in order to produce a certain depression which facilitates the admission of the solid particles into this annular space.

Finally on the shaft of the drum between the central inlet and outlet conduits a disc or discs or plates forming deflectors may be fixed. Blades may also be arranged on this central shaft so as to accelerate the rotary movement of the fluid in which powder dust is in suspension and to drive the solid particles towards the periphery.

The invention is illustrated in the accompanying drawings in which:

Figure 4 is an axial vertical section of a modification,

Figure 5 is a section along the line V—V of Figure 4, and

Figure 6 is a section on the line VI—VI of Figure 4.

Figure 1:
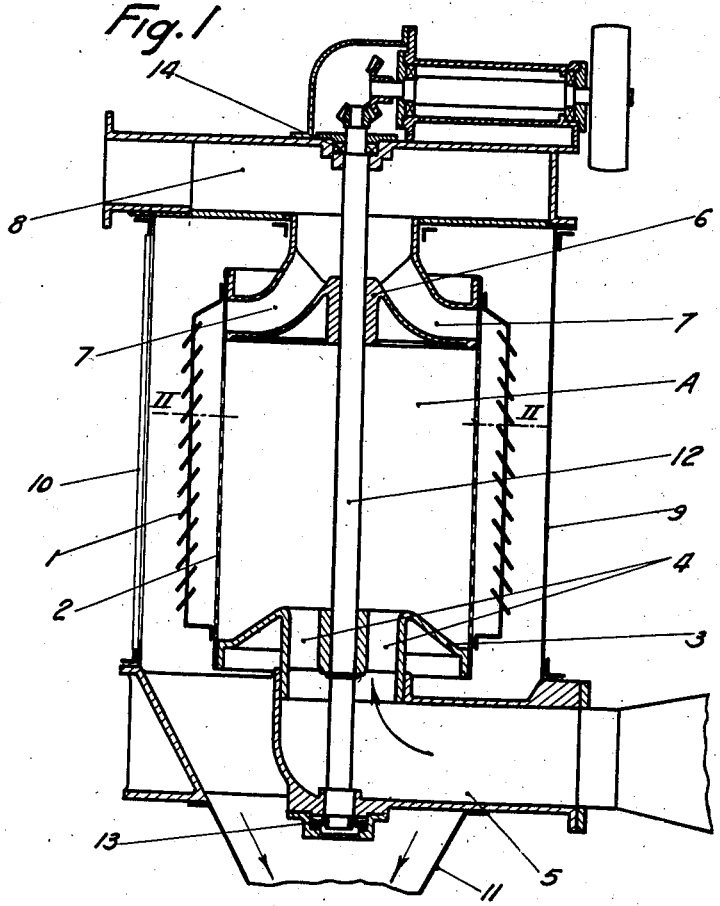
Figure 1 is a vertical axial schematic section of an embodiment of a device for carrying out the invention.
Figure 2:
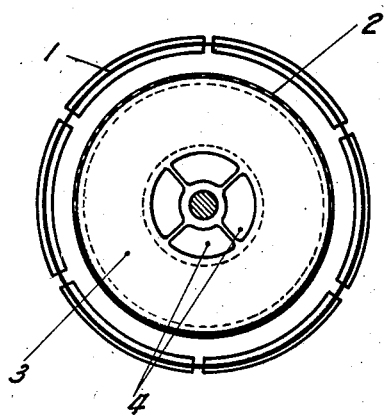
Figure 2 is a transverse section of this apparatus on line II—II of Figure 1.

In the example of Figures 1 and 2 the rotary drum arranged vertically comprises a lateral cylindrical wall 1 formed by superposed inclined louvres and encloses a cylinder 2 of wire gauze having the same axis as the wall 1. At its lower part the drum is provided with base 3 provided with central openings 4 to which is connected a conduit 5 serving for the introduction of the mixture of gaseous or liquid fluid and solid particles driven by means of a fan, a pump or other apparatus not shown. At the upper part of the drum is arranged a base 6 comprising radial conduits 7 substantially horizontal communicating with the annular space arranged between the wall 1 and the screen 2 and opening into an outlet conduit 8.

The drum A is enclosed in a fluid tight envelope 9 which may be provided with an inspection door 10 and extending from the lower part of the envelope is a conical hopper 11.

The said drum is fixed upon a shaft 12 which pivots in suitable bearings 13, 14 and which is actuated at its upper end by a suitable control device.

As is apparent from the foregoing description the mixture of gaseous or liquid fluid and solid particles introduced into the opening 4 to the interior of the drum A is subjected in this latter to a gyratory movement and it is divided through the screen 2 into a large number of jets which are substantially horizontal and which strike the louvres of the wall 1. Under the effect of centrifugal force the solid particles are applied to these louvres and due to the inclination of these are drawn off into the envelope 9 where they are collected towards the bottom in the hopper 11. The gaseous or liquid fluid escapes through the upper orifices 7 and is drawn off at 8. When the apparatus is used for the purification of a liquid fluid the envelope 9 must be filled with this liquid. The hopper 11 is then closed and the draining of the solid particles collected is carried out periodically.

Figure 3:
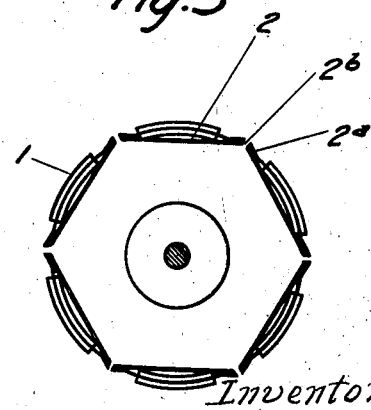
Figure 3 is an analogous section of a modification

In the modification of Figure 3 the screen 2 instead of being cylindrical has a polygonal section inscribed in the circumference of the wall 1 of the drum. The edges 2a of this screen are slightly projecting outside the drum and have, preferably over their whole length, an opening 2b which permits the direct expulsion under the action of centrifugal force of materials capable of accumulating in the angles.

In the modification of Figure 4 the wall of the rotary drum is formed solely by a cylinder of wire gauze 2 fixed through the intermediary of the bases 3 and 6' forming hubs on the shaft 12 which pivots in suitable bearings and which is actuated at its upper end by a suitable control device (not shown). The dimensions of the meshes of the wire gauze 2 are at least equal to the dimensions of the largest particles to be separated. A fluid tight fixed envelope 9 is extended at its lower part by a conical hopper 11 for the removal of the solid particles.

Central openings 4 are provided in the lower base 3. The conduit 5 serving for the introduction of the gaseous fluid is connected to these openings, which openings are separated by partitions 19 curved inwardly in the sense of the rotation of the drum and which play the part of blades. On the other hand the upper base 6' arranged in a similar manner to the lower base likewise comprises central openings 7' separated by inwardly curved partitions forming blades.

On the internal wall of the cylinder of wire gauze 2 are connected blades 15 inclined with respect to the vertical in the direction appropriate to produce an acceleration of the movement of the rotation of the mixture of fluid and solid particles, and which are preferably limited only to a part of the length of the said cylinder. Above the upper end of these blades a deflector 16 solid with the shaft 12 may be arranged and having a diameter less than that of the drum so as to leave a certain annular passage between its free edge and the perforated wall of the drum.

There may also be mounted upon the shaft 12 blades 18 which produce a movement of rotation even close to this shaft thus causing the so. 'd particles to be directed towards the periphery.

Upon the external wall of the cylinder 2 are connected blades 17 inclined in the same direction as the interior blades 15 but which stretch over the whole length of the cylinder.

The apparatus shown in Figure 4 may be used for separating particles suspended in a liquid or in a gaseous medium. It is particularly adapted for treating gaseous mediums and when the apparatus is employed for purifying a liquid, the fluid tight envelope 9 must be filled with said liquid. The hopper 11 is then closed near the bottom and the solid particles which collect therein are periodically removed.

What is claimed is:

1. Apparatus for separating solid particles from suspension in a fluid, comprising a rotatable axis, a drum rotatably mounted on said axis and having a peripheral wall constituted by a screen, the meshes of which have dimensions at least equal to those of the largest particles to be separated, a conduit for the supply of the suspension located at the center of the base of said drum, a conduit located at the top of said drum for the removal of fluid, a fixed fluid tight casing outside said drum and serving for the collection of the solid particles, partitions in the conduit for supply of the suspension and in the conduit for the removal of fluid, said partitions being curved to induce gyratory movement of the suspension, inclined blades located within the drum and fastened to and entirely supported by the inner wall thereof to induce gyratory movement of the suspension, blades mounted on the external wall of the drum and at least one deflector plate mounted on the axis of the drum.

2. In apparatus for separating solid particles from a fluid suspension, a shaft, a drum axially mounted on said shaft, said drum having its peripheral wall constituted by a screen, an inlet conduit axially connected at one end of said drum, an outlet conduit axially connected to the other end of the drum, a deflector plate mounted on said shaft, the outer margin of the plate being spaced from the inner wall of the drum, and blades secured to and supported entirely by the inner wall of the drum, and a fluid-tight casing outside said drum and spaced therefrom.

3. In apparatus for separating solid particles from a fluid suspension, a shaft, a drum axially mounted on said shaft, said drum having its peripheral wall constituted by a screen, an inlet conduit axially connected at one end of said drum, an outlet conduit axially connected to the other end of the drum, a deflector plate mounted on said shaft, the outer margin of the plate being spaced from the inner wall of the drum, blades secured to the shaft to urge the solid particles toward the periphery of the drum, and a fluid-tight casing outside said drum and spaced therefrom.

4. In apparatus for separating solid particles from a fluid suspension, a cylindrical screen rotatably mounted on a shaft, an axially located inlet conduit connected to one end of the screen, an axially located outlet conduit connected to the other end of the screen, said conduits having partitions therein which are curved to favor the gyratory movement of the suspension, said screen having a substantially unobstructed interior portion, blades secured to the inner wall of the screen inclined to aid the gyratory motion of the suspension, and a fluid-tight casing outside of said screen and spaced therefrom.

EUGÈNE CAMILLE SAINT-JACQUES.